United States Patent [19]

Webb

[11] Patent Number: 5,309,339
[45] Date of Patent: May 3, 1994

[54] CONCENTRATOR FOR LASER LIGHT

[75] Inventor: Robert H. Webb, Lincoln, Mass.

[73] Assignee: The Schepens Eye Research Institute, Inc., Boston, Mass.

[21] Appl. No.: 903,504

[22] Filed: Jun. 24, 1992

[51] Int. Cl.$^5$ .............................................. F21K 7/00
[52] U.S. Cl. .................................. 362/259; 362/301; 362/302; 362/343; 362/346; 356/236; 356/446
[58] Field of Search .............. 359/599, 641, 726, 727, 359/868, 869, 229, 385, 389; 362/259, 300, 301, 302, 343, 346; 356/236, 446

[56] References Cited

U.S. PATENT DOCUMENTS

| | | | |
|---|---|---|---|
| 1,589,664 | 6/1926 | Ryland | 362/302 |
| 3,490,827 | 1/1970 | Van Ligten et al. | 350/3.5 |
| 3,541,323 | 11/1970 | Stewart et al. | 362/259 |
| 3,633,999 | 1/1972 | Buckles | 350/171 |
| 3,749,906 | 7/1973 | Thiry | 362/301 |
| 3,838,926 | 10/1974 | Kato et al. | 356/236 |
| 4,062,996 | 12/1977 | Keafer, Jr. | 359/599 |
| 4,232,971 | 11/1980 | Suga | 356/446 |
| 4,257,401 | 3/1981 | Daniels | 359/726 |
| 4,309,746 | 1/1982 | Rushworth | 362/299 |
| 4,548,506 | 10/1985 | Elson | 356/446 |
| 4,551,628 | 11/1985 | Grossman | 250/503.1 |
| 4,583,860 | 4/1986 | Butner | 356/236 |
| 4,626,101 | 12/1986 | Ogawa et al. | 356/236 |
| 4,746,214 | 5/1988 | Akiyama et al. | 356/236 |
| 4,768,878 | 9/1988 | Heine et al. | 356/446 |
| 4,853,542 | 8/1989 | Milosevic et al. | 356/446 |
| 4,858,090 | 8/1989 | Downs | 362/346 |
| 4,932,779 | 6/1990 | Keane | 356/446 |
| 4,988,205 | 1/1991 | Snail | 359/869 |
| 5,109,465 | 4/1992 | Klopotek | 385/133 |

OTHER PUBLICATIONS

Labsphere (Sutton, N.H.) 1992 Catalog pp. 26-30; 74-75; and 84-88.
Burns et al. Jun./1991 Applied Optics 30: 2063-2065.

Primary Examiner—Stephen F. Husar
Assistant Examiner—Alan B. Cariaso
Attorney, Agent, or Firm—Lahive & Cockfield

[57] ABSTRACT

An optical concentrator increases the power density from diffuse optical energy remitted by an optically diffusing surface by at least partially recollimating the diffuse optical energy. The concentrator includes an optical diffuser element illuminated at a first point by optical input energy and remitting incident optical energy. A reflective element has a reflective surface with a concentration point located at the first point and the reflective surface reflects diffuse optical energy incident on it from the diffuser element. At least one aperture is provided for the transmission of an output beam formed by a portion of the diffuse optical energy from at least the diffuser element.

22 Claims, 5 Drawing Sheets

INPUT OPTICAL ENERGY

INPUT OPTICAL ENERGY

CONCENTRATOR FOR LASER LIGHT

BACKGROUND

This invention relates generally to optical source and illumination systems. It relates, more particularly, to an apparatus and method for increasing the available optical power from an optical beam from which spatial coherence and/or spatial inhomogeneity are removed. The apparatus and method are particularly useful with an optical beam produced by a laser source.

Lasers and other radiant energy sources have become commonplace in diverse fields, ranging from materials processing to holography to surgery. In many applications, uniform illumination of the target surface is important.

However, the use of coherent energy for illumination presents unique problems in many applications, due at least in part to optical interference effects. The occurrence of constructive and destructive interference of reflected energy, i.e., speckle, and the occurrence of beam intensity inhomogeneity, i.e., hot spots, are examples of these problems.

With further regard to the problem of interference, it is known that objects illuminated with a laser beam or other source of spatially coherent light display a fine grained speckle pattern distributed over the surface. This speckle pattern is invariant with respect to time if the object is immobile. Speckle is believed to be attributable to the finite roughness of the surface being illuminated. For instance, a laser beam, being coherent, reflects off a rough surface at various angles, and the reflections randomly interfere in space with one another and with the incident beam. This constructive and destructive interference appears to the eye or camera as a condition termed "speckle".

In addition to problems manifest in the use of spatially coherent energy, many laser generating systems, e.g., sources, produce output beams having spatially non-homogeneous intensity profiles. One example is laser systems that produce beams having "hot spots", which typically are ring-shaped or star-shaped, and these intensity variations are undesirable in many applications.

Various methods have been used to improve beam uniformity and to reduce speckle during the propagation between a laser source and a target. For instance, known homogenizing apparatus includes kaleidoscopes, lens and prism systems, waveguides having substructures to homogenize a laser beam passing therethrough, spatial filters, integrating cavities, and other diffusive surfaces for providing lambertian radiation distribution. See for examples the Buckles U.S. Pat. No. 3,633,999; the Van Ligten et al. U.S. Pat. No. 3,490,827; the Klopotek et al. U.S. Pat. No. 5,109,405; the Grossman U.S. Pat. No. 4,551,628; the Rushworth U.S. Pat. No. 4,309,746; and Burns et al. (1991) *Applied Optics* 30:2063.

However, the price paid for removing speckle or hot spots from a laser beam is typically the loss of the tight collimation of the beam and the consequent loss of high irradiance. In fact, diffusive mechanisms heretofore used to homogenize optical energy, in general, result in a radiant flux being distributed over too large a solid angle for capture by a practical lens or equivalent element.

It is accordingly an object of this invention to provide an apparatus and method for increasing the power density from diffuse optical energy re-emitted by an optically diffusing surface.

Other objects of the invention will in part be obvious and will in part appear hereinafter.

SUMMARY OF THE INVENTION

The invention provides an apparatus and a method for concentrating diffuse optical energy re-emitted by an optically diffusing surface.

Apparatus according to the invention employs a diffuser for diffusely re-emitted incident optical energy and a reflective surface having a concentration point to which incident optical energy is reflected. The diffuser is disposed such that optical energy from the source is incident upon the diffuser at an irradiation point. The reflective surface is disposed relative to the diffuser such that the concentration point is spatially coincident with the irradiation point.

There is at least one associated aperture providing for the input of optical energy to the system and for the output of optical radiation from the system. Optical energy incident upon the irradiation point of the diffuser is diffusely reflected. A portion of the diffusely reflected optical energy is transmitted by the aperture, while the remaining diffuse optical energy in the system is reconcentrated to the irradiation point by reflection from the reflective surface. Thus, optical energy stays in the concentrator system until transmitted by an aperture to an output element that is to be illuminated. By virtue of the diffuse optical energy being remitted from a relatively small surface area, the optical energy transmitted by the aperture as an output optical beam is at least partially recollimated.

The invention accordingly comprises the several steps and the relation of one or more of such steps with respect to each of the others, and the apparatus embodying features of construction, combinations of elements and arrangement of parts which are adapted to effect such steps, all as further exemplified in the following detailed disclosure, and the scope of the invention is indicated in the claims.

DESCRIPTION OF ILLUSTRATED EMBODIMENTS

Figure 1:
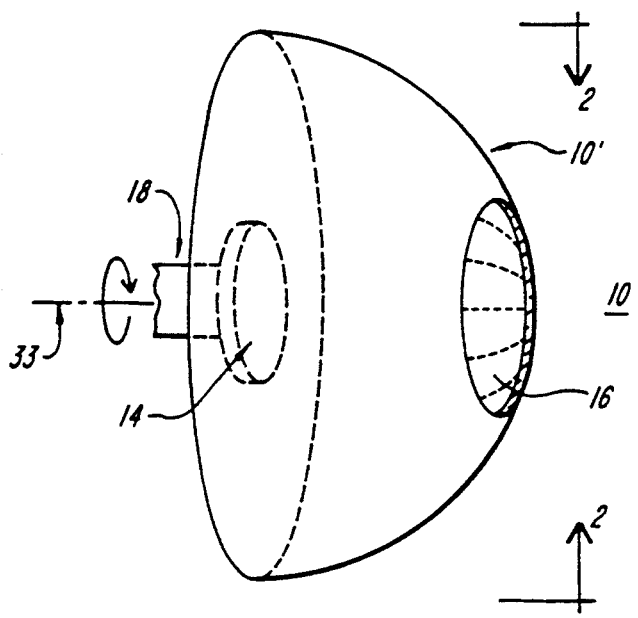
FIG. 1 is a perspective view of a concentrator according to the invention for use with a diffusely reflecting surface.
Figure 2:
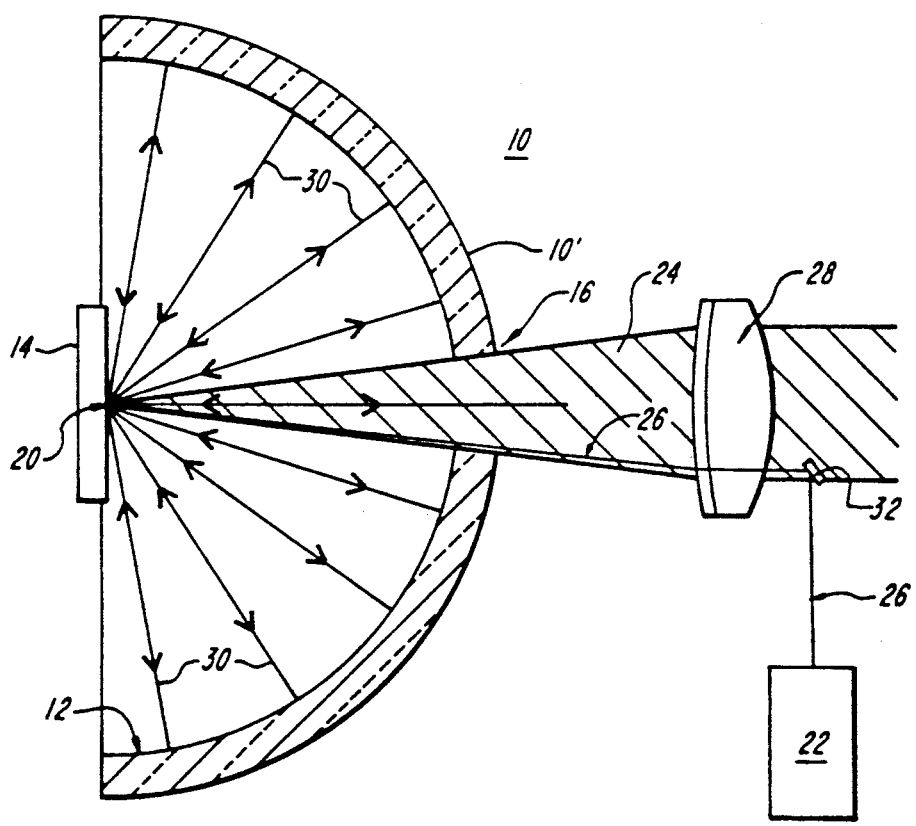
FIG. 2 is a cross-sectional view of the concentrator of FIG. 1 taken along line 2—2.

FIGS. 1 and 2 show an optical concentrator system 10 according to the invention for concentrating diffusely re-emitted optical energy from a diffuser 14. The illustrated concentrator system 10 has a concentrator 10' with a hemispheric reflective surface 12 for reflecting optical energy. The geometric shape of the reflective surface 12 provides a concentration point 20. The concentration point 20 is defined as a self-conjugate point. Thus, optical energy emitted from the concentration point 20 is reflected back to the concentration point 20 by the reflective surface 12. The reflective surface 12 can be made using standard optical techniques. It is generally desirable that the reflective surface 12 be totally reflective. For example, the reflective surface 12 can be created by applying a mirror coating to a substrate. Alternatively, the reflective surface 12 can be machined from a solid reflective material, with the material itself providing the mirrored surface.

FIGS. 1 and 2 also show that diffuser 14 is disposed at the concentration point 20 such that optical energy incident upon the diffuser 14 at the concentration point 20 is diffusely reflected from the concentration point 20.

The illustrated concentration system 10 has an aperture 16 for transmitting optical energy into and out of the concentrator 10', and hence serves as both an input aperture and an output aperture.

With reference to FIG. 2, the illustrated concentrator system 10 functions as follows. An optical energy source 22 generates an input beam 26 of optical energy incident upon the diffuser 14 at the concentration point 20. Turning mirrors and prisms, such as a mirror 32, are examples of optical elements that can be disposed along the path of input beam 26 to direct the beam 26 to the concentration point 20. In the embodiment of FIG. 2, the input beam 26 successively traverses the turning mirror 32, an output lens element 28 and the aperture 16 before being incident on the diffuser 14.

The incident input beam 26 is diffusely reflected by the diffuser 14 The resultant diffuse optical energy 30 from the diffuser 14 incident upon the reflective surface 12 is reflected back to the concentration point 20 where it can again be diffusely reflected. The portion of the diffuse optical energy 30 that is directed to the aperture 16 is transmitted from the concentrator 10' by the aperture 16 as an output optical energy beam 24. Because the cross-section of the output beam 24 is restricted by the size of aperture 16, the optical energy emitted by the concentrator system 10 is partially collimated relative to the diffuse optical energy emitted by the diffuser 14 alone. The output beam 24 can be further collimated or focused by a lens 28.

In this manner, optical energy applied to the concentrator system 10 from the source 22 is diffused and reconcentrated repeatedly until it exits from the concentrator 10' by way of the aperture 16. Thus, optical energy that would not have been captured by a lens if only a diffuser were used, is now "trapped" in the system 10 until released by the aperture 16. In a hypothetical zero loss system, in which no energy is absorbed by either the diffuser 14 or the reflective surface 12, all optical input energy imparted upon the diffuser 14 would ultimately be transmitted by the aperture 16.

A concentrator system according to the invention can have one aperture or more than one aperture for the transmission of input and output beams of optical energy. FIG. 3B illustrates an embodiment that has separate input and output apertures. The concentrator system 10B (FIG. 3B) is substantially similar to the concentrator system 10 of FIGS. 1 and 2. However, in the embodiment of FIG. 3B, the input beam 26 is directed through an aperture 16B separate from an output aperture 16'.

Figure 3A:
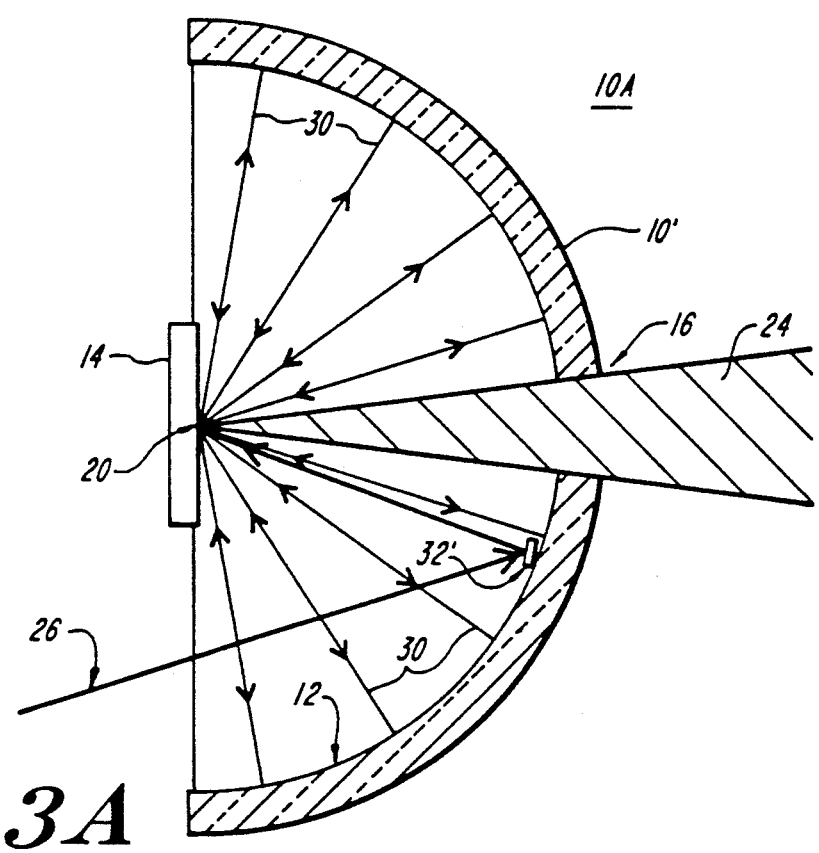
FIGS. 3A–C are cross-sectional views of concentrators according to the invention and having separate input and output apertures.
Figure 3B:
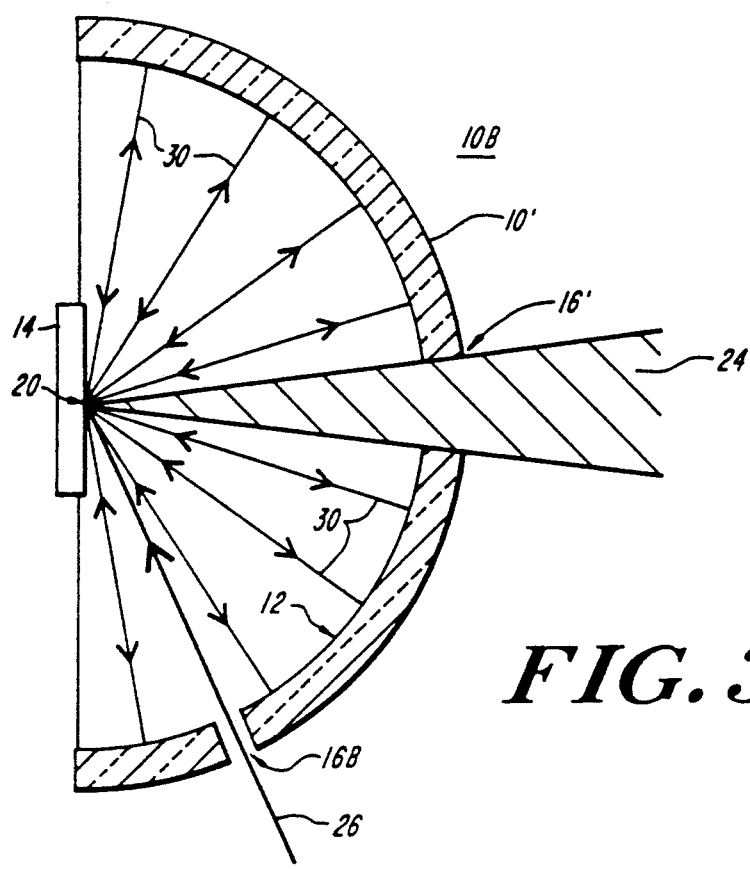
Figure 3C:
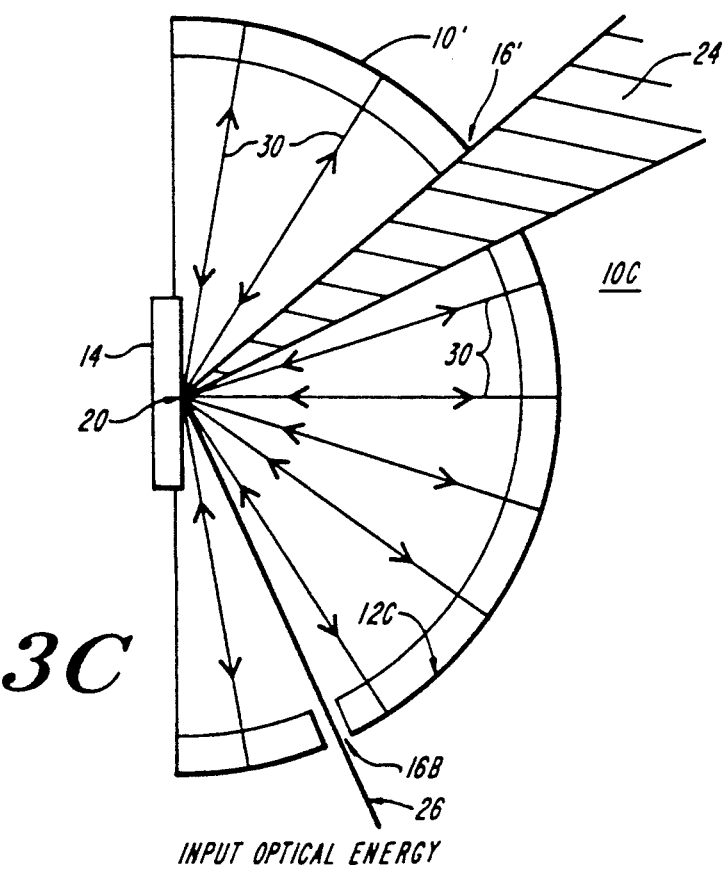

Likewise, FIGS. 3A and 3C show multi-apertured concentrator systems 10A and 10C respectively. The system of FIG. 3A has a turning mirror 32' that can direct the input beam 26 to the concentration point 20 on the diffuser 14. The mirror 32' of the system of FIG. 3A is located in the optical path between the diffuser 14 and the reflective surface 12. As further illustrated by the system of FIG. 3C, the optical axis of the output aperture 16 need not be normal to the plane of the diffuser 14, as it is in the systems of FIGS. 2, 3A and 3B. In addition, the system of FIG. 3C illustrates that the concentrator 10' can be fabricated such that the reflective surface 12C is disposed on the outside of the concentrator 10'. In this instance, it is generally desirable that the intervening layers between the concentration point 20 and the reflective surface 12C be highly optically transmissive and non-distorting at wavelengths corresponding to the incident radiation.

It is known in the art that a material having a surface roughness greater than the wavelength of the incident optical energy can be useful as a diffuser. In a preferred embodiment, the diffuser 14 for the foregoing concentrator systems is a Lambertian radiator, wherein the re-emitted light is distributed as a function of the cosine of the angle between the direction of emission and the angle normal to the diffuser surface. Thus, the diffusely remitted light from a Lambertian diffuser fills a $2\pi$ steradian hemisphere centered at the concentration point 20. It is generally desirable that the diffusive surface of the diffuser employ a material that is either highly reflective or highly transmissive, to minimize power loss due to absorption by the diffuser. For example, diffusers useful in the concentrator systems described above include surfaces coated with magnesium oxide or with barium sulphate (for example, white reflectance Coating 6080 available from Kodak Laboratory Chemicals, Rochester, N.Y.). Other coatings useful to provide the diffusive surface are Spectralon as marketed by Labsphere in North Sutton, N.H.; polycrystalline diamond; and ground glass discs. Those diffusive materials that are highly optically transmissive, can be rendered diffusely reflective by mirroring one surface such that optical energy passing through the diffusely transmissive layer is reflected back by the mirrored layer. For instance, a thin polycrystalline diamond film can be silver coated on one surface to create a diffusely reflective element, for example, the diffuser 14 in FIG. 2 can have a diffusive film 14a and a reflective silver coating 14 b.

In some applications, it may be advantageous to move the diffuser 14 relative to the incident optical energy. The motion is, however, to provide a diffuser concentration point 20 that remains spatially fixed relative to the reflective surface 12. One such motion of the diffuser 14 is obtained, as shown in the system of FIG. 1, by mounting it on a shaft 18 that rotates about an axis 33 normal to the plane of the diffusive surface. For instance, a rotating magnesium oxide disc used as a diffuser 14 can be used for speckle blurring of the incident optical energy. Those skilled in the art will appreciate alternate diffusers can be used for despeckling coherent optical energy.

Figure 4A:
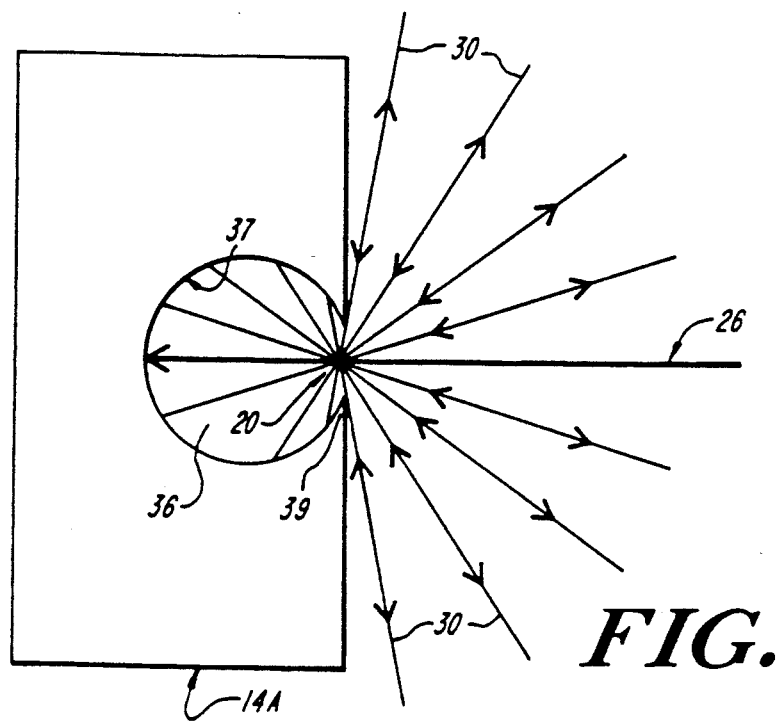
FIGS. 4A and 4B are cross-sectional views illustrating integrating spheres useful as reflective diffusing surfaces in the practice of the invention.
Figure 4B:
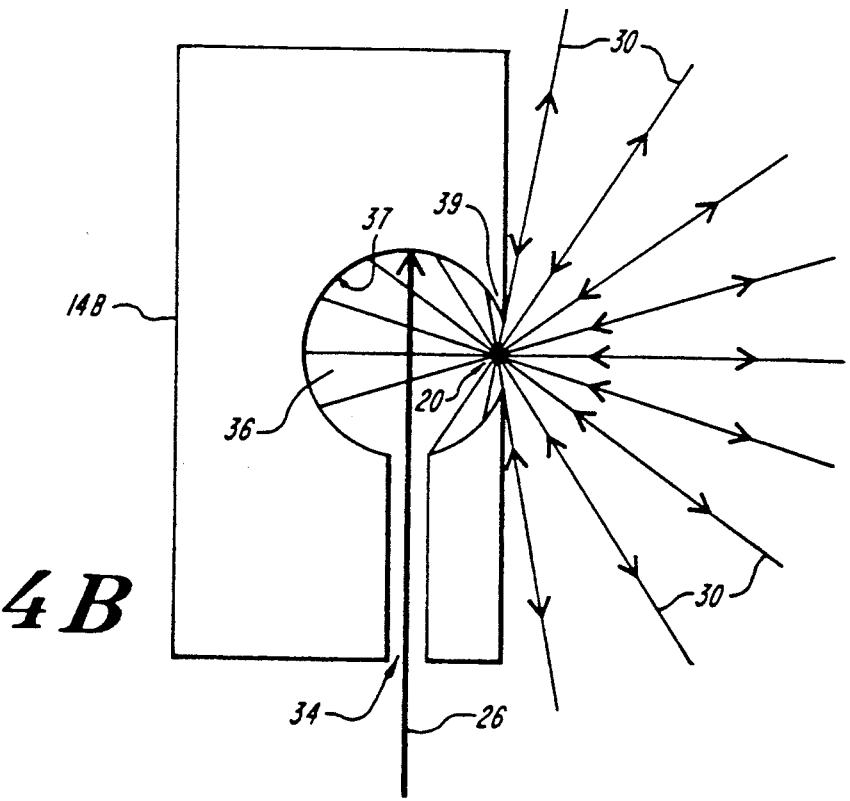

Alternative to employing a diffuser 14 having a substantially planar diffusive surface as shown in FIGS. 1, 2, 3A, 3B and 3C, the diffuser can provide the diffusive surface within a cavity. FIG. 4A shows the substructure of a diffuser 14A having such an optically integrating cavity 36 that functions as a Lambertian radiator. The use of such integrating cavities for the homogenization of optical energy is known in the art. The cavity can be milled from, or coated with, an optically diffusing material, with the diffusing surface 37 of the integrating cavity 36 being highly reflective. The integrating cavity 36 has an optical aperture, e.g., the aperture 39 of FIG. 4A, aligned with the input beam 26 for entry of the input energy to the cavity. Optical energy exits from the cavity by way of the same aperture, or also by a further aperture as illustrated in FIG. 4B. It is generally desirable to restrict the size of the radiance aperture 39 for transmission of the diffuse optical energy 30 into and out of the integrating cavity 36 to provide a relatively small concentration point 20. As stated above, the ability of the concentrator to recollimate the output beam 24 by the aperture 16 in the reflective surface (FIG. 2) is in part determined by the size of the concentration pint 20 and therefor of the radiance aperture 39 of the integrating cavity 36.

FIG. 4B illustrates a diffuser 14B substantially similar to the diffuser 14A of FIG. 4A with the exception that the integrating cavity 36 in FIG. 4B has an output aperture 39, as in the embodiment of FIG. 4A, and has a separate diffuser input aperture 34 for the irradiation of the integrating cavity 36 with the input beam 26.

Figure 5:
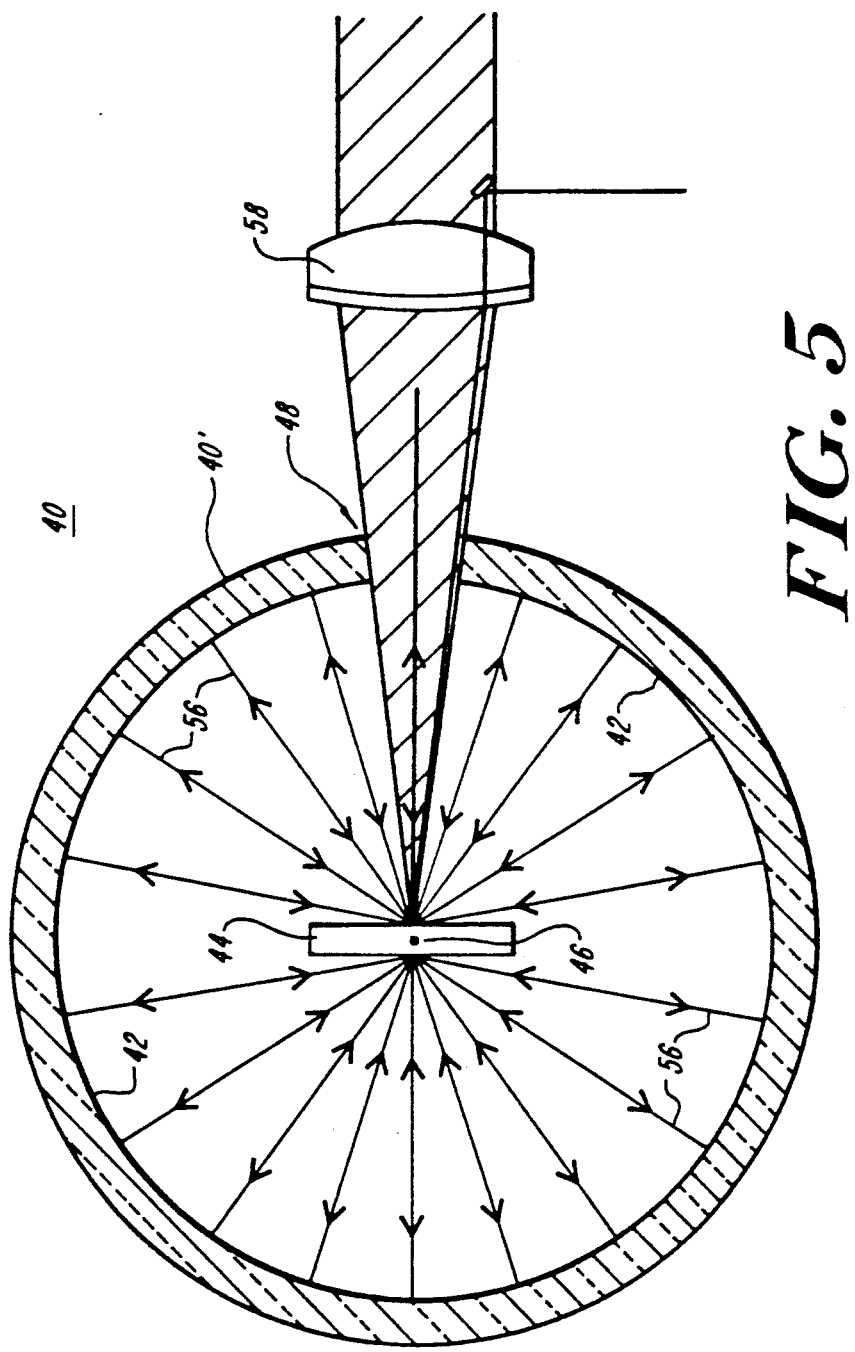
FIG. 5 is a cross-sectional view of another concentrator according to the invention and for use with a diffusely transmissive surface.

FIG. 5 shows a concentrator system 40 for concentrating diffusely re-emitted optical energy from a diffusely transmissive diffuser 44. The illustrated concentrator system 40 has a concentrator 40' with a spherical reflective surface 42 for reflecting optical energy to a concentration point 46. A diffuser 44 is disposed at the concentration point 46 such that optical energy incident upon the diffuser 44 at the concentration point 46 is diffusely transmitted by the diffuser 44. Thus the concentrator system 40 of FIG. 5 functions as follows. An optical energy input beam 50 is incident upon the diffuser 44 at the concentration point 46, and is diffusely transmitted by the diffuser 44. The resultant diffuse optical energy 56 incident upon the reflective surface 42 is reflected back to the concentration point 46 where it can repeat the diffusive transmissive process. Some of the diffuse optical energy 56 is transmitted from the concentrator 40 by an aperture 48 as an output optical beam 52. Similar to the embodiment of FIGS. 1 and 2, the output optical beam 52 can be further collimated or focussed by lens 58.

Although particular embodiments of this invention have been described and illustrated herein, it is recognized that modifications and variations may readily occur to those skilled in the art. Consequently, it is intended that the claims be interpreted to cover such modifications and equivalents.

Having described the invention, what is claimed is:

1. Apparatus for diffusing and concentrating coherent optical energy, comprising
    optical source means producing a beam of substantially coherent optical energy illuminating incident on a first point,
    diffuser means disposed at said first point for diffusely re-emitting said coherent optical energy incident thereon at said first point, said diffuser means having a surface roughness greater than the wavelength of said coherent optical energy,
    reflective means having a reflective surface having a concentration point disposed at said first point, said reflective surface being disposed for reflection of diffuse optical energy incident thereon and re-emitted from said diffuser means and for concentrating said diffuse optical energy to said concentration point, and
    means forming at least one aperture in said reflective means for the transmission of an output beam formed by a portion of said diffuse optical energy re-emitted from said diffuser means,
    said diffuser means and said reflective means and said aperture being further arranged for in part reflecting from said reflective surface to said concentration point, and for in part transmitting through said aperture, said diffuse optical energy from said diffuser means.

2. Apparatus according to claim 1 wherein said reflective surface is substantially hemispheric in shape and has a center of curvature coinciding with said concentration point.

3. Apparatus according to claim 1
    wherein said diffuser means is arranged to receive input optical energy directed along an input path for irradiation of said first point, and
    wherein said aperture has an optical axis substantially concentric with said input path.

4. Apparatus according to claim 1 wherein said diffuser means is arranged to received incident optical energy directed along an input path, and wherein said diffuser means has a diffusive surface disposed substantially in a plane normal to said input path.

5. Apparatus according to claim 1 wherein said diffuser means and said aperture are so arranged that incident optical energy is incident to said diffuser means along an input path passing through said aperture, so that said aperture serves as both an input aperture and an output aperture.

6. Apparatus according to claim 1 wherein said aperture includes an optical lens transmissive to said output beam.

7. Apparatus according to claim 6 wherein said lens is a collimating lens.

8. Apparatus according to claim 1 wherein said diffuser means includes a substantially Lambertian diffuser.

9. Apparatus according to claim 1 wherein said diffuser means is substantially diffusely reflective.

10. Apparatus according to claim 9 wherein said diffuser means is of an optically diffusing material selected from the group consisting of Magnesium Oxide and Barium Sulphate.

11. Apparatus according to claim 9 wherein said diffuser means comprises a transmissive diffusive element for diffusing coherent optical energy passing therethrough and a reflective element for reflecting diffuse optical energy incident thereon, said reflective element being disposed to reflect diffuse optical energy transmitted by said transmissive diffusive element.

12. Apparatus according to claim 1 wherein said diffuser means comprises an integrating cavity.

13. Optical illumination apparatus, comprising
    A) an optical source producing an input beam of substantially coherent optical energy, and
    B) an optical concentrator having
        (i) diffuser means disposed at a first point for illumination by said input beam, said diffuser means being disposed for diffusely re-emitting said substantially coherent optical energy incident thereon at said first point, said diffuser means having a surface roughness greater than the wavelength of said coherent optical energy,
        (ii) reflective means having a reflective surface having a concentration point disposed at said first point, said reflective surface being disposed for reflection of diffuse optical energy incident thereon re-emitted from said diffuser means and for concentrating said diffuse optical energy to said concentration point, and (iii) means forming at least one aperture in said reflective means for the transmission of an output beam formed by a portion of said diffuse optical energy re-emitted from said diffuser means, (iv) said diffuser means and said reflective means and said aperture being further arranged for in part reflecting from said reflective surface to said concentration point, and for in part transmitting through said aperture, said diffuse optical energy from said diffuser means.

14. An optical concentrator for concentrating despeckled laser radiation, comprising optical source means for producing a beam of laser radiation, despeckling means disposed at a first point for despeckling said laser radiation incident thereon at said first point, said despeckling means having a surface roughness greater than the wavelength of said laser radiation.

reflective means having a reflective surface having a concentration point disposed at said first point, said reflective surface being disposed for reflection of despeckled laser radiation re-emitted by said despeckling means and for concentrating said despeckled laser radiation to said concentration point, and means forming at least one aperture in said reflective means for transmission of said despeckled laser energy re-emitted from said despeckling means, said despeckling means and said reflective means and said aperture being arranged for in part reflecting from said reflective surface to said concentration point, and for in part reflecting through said aperture, said despeckled laser energy re-emitted by said despeckling means.

15. Optical apparatus for concentrating diffuse optical energy re-emitted from a diffusely re-emitting surface, comprising A) means for irradiating at a first point a substantially coherent optical energy beam, B) means for diffusing and re-emitting said coherent optical energy beam incident at said first point, said means for diffusing having a surface roughness greater than the wavelength of said coherent optical energy beam, C) means for reflecting to said first point a portion of diffuse optical energy re-emitted from said first point, and D) means for transmitting a portion of diffuse optical energy re-emitted from said first point.

16. A method of concentrating diffuse optical energy re-emitted from a diffusely re-emitted surface, comprising the steps of A) irradiating at a first point a substantially coherent optical energy beam, B) diffusing and re-emitting said coherent optical energy incident at said first point, C) reflecting to said first point a portion of diffuse optical energy re-emitted from said first point, and D) transmitting a portion of diffuse optical energy re-emitted from said first point.

17. Apparatus according to claim 1, wherein said reflective means further includes second reflective means for directing an input optical energy beam to said diffuser means.

18. Apparatus according to claim 1 further comprising means forming a second aperture in said reflective means for the transmission of said incident optical energy through said reflective means and directed towards said diffuser means.

19. An optical concentrator according to claim 14 further comprising rotation means for rotating said despeckling means for spatially diffusing laser speckle.

20. Optical apparatus for concentrating diffuse optical energy re-emitted from a diffusely re-emitting surface, said apparatus comprising optical source means for producing a substantially coherent optical energy beam, a diffusely re-emitting surface having a surface roughness greater than the wavelength of said coherent optical energy beam, means for directing said coherent optical energy beam onto a first point of said diffusely re-emitting surface, means for reflecting to said first point a portion of diffuse optical energy re-emitted from said first point on said diffusely re-emitting surface, and means for transmitting a portion of diffuse optical energy re-emitted from said first point, without such energy being again incident on said means for reflecting.

21. A method of concentrating diffuse optical energy re-emitted from a diffusely re-emitting surface, said method comprising the steps of A) directing a substantially coherent optical energy beam onto a first point of a diffusely re-emitting surface, B) reflecting to said first point, with a reflecting element, a portion of diffuse optical energy re-emitted from said first point on said diffusely re-emitting surface, and C) transmitting a portion of diffuse optical energy re-emitted from said first point, without such energy being again incident on said reflecting element.

22. Apparatus according to claim 1 wherein said diffuser means is arranged to both reflect and transmit diffuse optical radiation.

* * * * *